(12) United States Patent
Rafalovich et al.

(10) Patent No.: US 8,181,250 B2
(45) Date of Patent: May 15, 2012

(54) PERSONALIZED HONEYPOT FOR DETECTING INFORMATION LEAKS AND SECURITY BREACHES

(75) Inventors: Ziv Rafalovich, Yokneam Ilit (IL); Lior Arzi, Atlit (IL); Ron Karidi, Herzeliya (IL); Efim Hudis, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 716 days.

(21) Appl. No.: 12/165,460

(22) Filed: Jun. 30, 2008

(65) Prior Publication Data

US 2009/0328216 A1    Dec. 31, 2009

(51) Int. Cl.
*G06F 11/00* (2006.01)
*G06F 12/14* (2006.01)

(52) U.S. Cl. ............... 726/23; 726/26; 726/24; 726/25; 726/22; 726/13; 726/14; 713/187; 713/188

(58) Field of Classification Search ................. None
See application file for complete search history.

(56) References Cited

U.S. PATENT DOCUMENTS

| | | | |
|---|---|---|---|
| 7,026,926 B1 * | 4/2006 | Walker, III | 340/539.11 |
| 7,219,148 B2 | 5/2007 | Rounthwaite et al. | |
| 7,519,726 B2 * | 4/2009 | Palliyil et al. | 709/232 |
| 7,665,134 B1 * | 2/2010 | Hernacki et al. | 726/22 |
| 7,752,664 B1 * | 7/2010 | Satish et al. | 726/22 |
| 2003/0084349 A1 | 5/2003 | Friedrichs et al. | |
| 2004/0128543 A1 | 7/2004 | Blake et al. | |
| 2006/0224677 A1 | 10/2006 | Ishikawa et al. | |
| 2007/0028301 A1 | 2/2007 | Shull et al. | |
| 2007/0192853 A1 | 8/2007 | Shraim et al. | |
| 2009/0019547 A1 * | 1/2009 | Palliyil et al. | 726/25 |
| 2009/0241191 A1 * | 9/2009 | Keromytis et al. | 726/23 |
| 2009/0241196 A1 * | 9/2009 | Troyansky et al. | 726/25 |

FOREIGN PATENT DOCUMENTS

WO    2006131124 A1    12/2006

OTHER PUBLICATIONS

Craig Valli,"Honeypot Technologies and their Applicability as an Internal Countermeasure", 2005, 5 Pages.
Ralph Edward Sutton,"How to build and use a Honeypot", 13 Pages , 2005.
Jason Coombs,"IIS Security and Programming Countermeasures", 440 Pages, 2003.
Scottberg, "Internet Honeypots: Protection or Entrapment?", 2002, Pages 387-391.

* cited by examiner

*Primary Examiner* — Fikremariam A Yalew
(74) *Attorney, Agent, or Firm* — Mayer & Williams P.C.

(57) ABSTRACT

A honeypot in a computer network is configured for use with a wide variety of computing resources that are defined by a network administrator or user which may include desktop and network resources such as address book contacts, instant messaging contacts, active directory user accounts, IP addresses, and files that contain particular content or that are stored in particular locations. The resources may be real for which protection against leakage is desired, or fake to operate as bait to lure and detect malicious attacks. The honeypot is implemented in an extensible manner so that virtually any resource may be honeypotted to apply honeypot benefits to resources beyond static IP addresses in order to improve both the breadth of information leakage prevention and the detection of malicious attacks.

17 Claims, 13 Drawing Sheets

PERSONALIZED HONEYPOT FOR DETECTING INFORMATION LEAKS AND SECURITY BREACHES

BACKGROUND

While the Internet has had great successes in facilitating communications between computer systems and enabling electronic commerce, home users and users in computer networks such as enterprise and corporate networks connected to the Internet have been under almost constant attack by hackers seeking to disrupt their operation. Many of the attacks seek to exploit vulnerabilities of the application programs, operating systems, and other computer programs executing on those computer systems. Some of the destructive methods of attacking a computer system have been to infect the computer system with software that is designed specifically to damage or disrupt the computer system. And a growing threat in the information security domain is data leakage where attacks are implemented to retrieve valuable information from the system.

When an attacker (i.e., either a human hacker or software) invades a computer system, the integrity of the computer system may become greatly compromised. Malware commonly includes computer worms, viruses, Trojan horses, spyware, and so forth. Some malware behaves nefariously, such as by illicitly collecting and transmitting personal information. Some malware can hijack resources needed by operating system components or use these resources to subvert the security of the operating system. For example, such malware can cause an unprotected network resource to open a TCP/IP (Transport Control Protocol/Internet Protocol) port that allows the hacker to access the system's resources.

Hackers increasingly utilize automated scanning methods to identify IP addresses in order to find vulnerable victims. Once a victim is located, a common type of malware acquires computer systems or resources—i.e., targets—in order to propagate itself using the acquisitions. For example, the malware could be a worm that launches a self-propagating attack that exploits a vulnerability of a computer system by taking control and using that computer system to find other computer systems with the same vulnerability and launch attacks (i.e., sending the same worm) against them.

Various techniques have been developed and used to help detect the presence of such malware but unfortunately, detection of some malware has proved to be difficult. One technique attempts to set a trap, called a "honeypot" to detect the unauthorized use of network resources. A honeypot outwardly appears like any other computer system but is closely monitored. Typically, honeypots are configured to mimic real systems that a hacker would like to break into, but are designed to limit the hacker's access to other network resources. The honeypot can act as a decoy to lure hackers in order to understand their activities and better understand the vulnerabilities of a security system. In addition, when a hacker stepping into a honeypot is detected, steps can be taken to stop the hacker from accessing the real, non-honeypotted resources in a network. Well designed honeypots will fool a hacker into believing that the legitimate resources are being hacked into and the hacker will not realize that the activities are being monitored.

When the honeypot is accessed by the hacker, the monitoring system assumes that this is a malicious access and blocks the intruder while alerting the administrator. For example, unused IP addresses in the enterprise, such as a subnet, can be set up as the "bait" for one or more honeypots in order to detect attacks. The computer systems that are configured as honeypots at these IP addresses will typically not provide any real services other than to record the activities of the hacker. These honeypots are designed to wait for and detect unauthorized access of the IP addresses. The theory behind creating honeypots is that a worm or automated program used by a hacker for scanning IP addresses is going to step on the honeypot and become detected.

While honeypots can be effective in detecting and blocking malicious access to resources, the current IP address bait relies, in large part, on the hacker, worm or automated program blindly attempting to connect to multiple IP addresses. As hackers become more sophisticated in their methods of acquiring targets, these honeypots are becoming less successful at detecting sophisticated attacks.

This Background is provided to introduce a brief context for the Summary and Detailed Description that follow. This Background is not intended to be an aid in determining the scope of the claimed subject matter nor be viewed as limiting the claimed subject matter to implementations that solve any or all of the disadvantages or problems presented above.

SUMMARY

A honeypot in a computer network is configured for use with a wide variety of computing resources that are defined by a network administrator or user which may include desktop and network resources such as address book contacts, instant messaging contacts, active directory user accounts, IP addresses, and files that contain particular content or that are stored in particular locations. The resources may be real for which protection against leakage is desired, or fake to operate as bait to lure and detect malicious attacks. The honeypot is implemented in an extensible manner so that virtually any resource may be honeypotted to apply honeypot benefits to resources beyond static IP addresses in order to improve both the breadth of information leakage prevention and the detection of malicious attacks. When a resource is honeypotted, a separate server which is typically located at the network perimeter is notified which then monitors assets within the organization that are looking for the honeypot. The monitoring server issues an alert when an attempt is made to use or move the honeypotted resource across the network boundary because such movement is assumed to be malicious. The honeypot definition and the monitoring functionality are supported on separate platforms so that any compromise of a desktop machine containing the target resource will not reveal the existence of the honeypot to the attacker.

In various illustrative examples, honeypotted resources may be defined on a local host or on a remote server as may be used in an online file storage service or other Internet-based, or "cloud" computing service such as a photo-sharing website. Notification of the honeypotted resource to the honeypot monitor is made using a communication channel that is separate and secure from the channel over which data traffic is carried on the network to further protect the honeypot. The monitoring of honeypotted resources may be performed by specialized business application servers such as instant messaging ("IM") servers, e-mail servers, firewalls, event-monitoring and logging servers, and the like in an enterprise network environment, or by a home server in a home network environment. Alternatively, the monitoring of honeypotted resources may be performed using a cloud based server as a service.

A honeypotted fake user account or user may also be established in an enterprise network. In this example, an administrator configures a host machine to operate as if it were being used by a real user and may bait the machine with resources that would be of interest to a hacker. Because no legitimate user would ever have reason to access, use, or move the resources on the host supporting the honeypotted user account, any activity detected by the monitoring can be assumed to be malicious.

Resources may also be honeypotted in other computing environments such as those using large-scale line-of-business applications which may include a number of integrated modules supporting functions such as accounting, supply chain management, and resource planning.

The present honeypot arrangement advantageously operates at a content or application level in a network environment rather than at the transport level that conventional honeypots use by their focus on IP addresses. By providing a flexible platform that can accommodate a variety of resources in the network or on the cloud, the both administrators and users are provided with the ability to customize or personalize the honeypot to meet their specific needs.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DESCRIPTION OF THE DRAWINGS

Like reference numerals indicate like elements in the drawings. Elements are not drawn to scale unless otherwise indicated.

DETAILED DESCRIPTION

Figure 1:
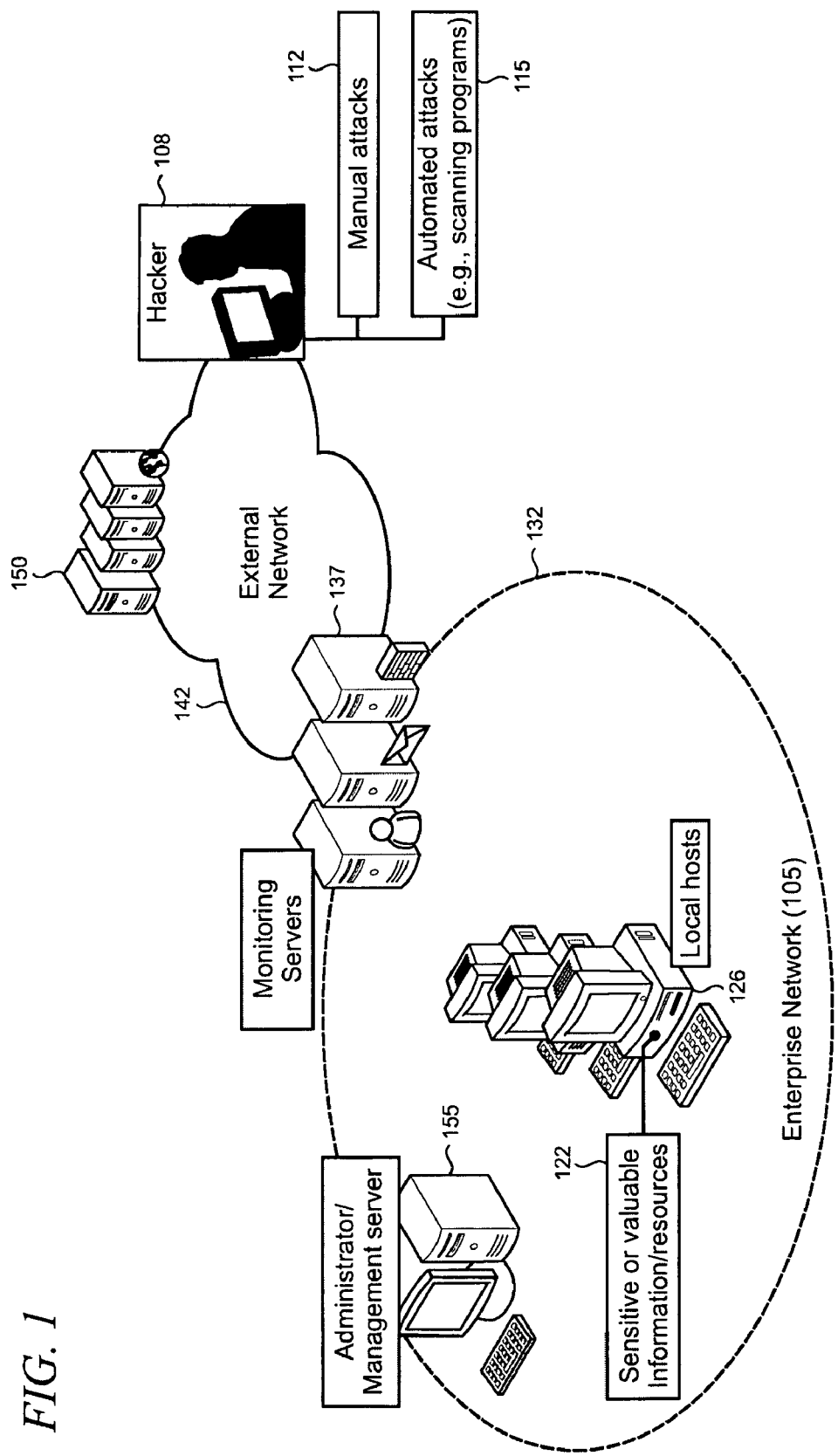
FIG. 1 shows an illustrative enterprise network computing environment that is subject to attacks from a hacker.

FIG. 1 shows an illustrative enterprise network 105 that is subject to attacks from a hacker 108. Hacker 108 may utilize a variety of attack vectors that originate from outside the enterprise network 105 (or in some cases from inside) including manual attacks 112 and automated attacks 115 that employ automated techniques such as scanning programs that look for victims or vulnerabilities to exploit. Increasingly, such scanning is used to attempt access to sensitive or valuable information and resources (collectively identified by reference numeral 122) which may be contained on one or more local host machines 126 each typically including a computer-readable medium, not comprising a propagated signal, containing instructions that are executable by one or more processors disposed in the host machine. The hacker 108 may employ malware that propagates using such information that is leaked from the enterprise network 105. For example, the malware may scan computers for personal information such as an e-mail address book and then propagate itself by forwarding a crafted e-mail to all the contacts in the address book. While existing honeypot solutions are not well suited to the detection of such exploits, the present personalized honeypot arrangement enables virtually any computer-based resource, including personal information such as address books, to be honeypotted as described in more detail below.

On the perimeter 132 of the enterprise network 105 are located a multiplicity of business application-specific servers, collectively identified by reference numeral 137. While the number and type of servers 137 may vary between implementations, the servers may provide functionalities such as e-mail, instant messaging ("IM"), firewall, event monitoring and logging, and auditing/journaling. In this example, the servers 137 are configured for monitoring communications that flow between the enterprise network 105 and an external network 142 such as the Internet through which resources 150 such as databases and websites may be accessed by the hosts 126.

A management server 155 that is typically used by a network administrator is also supported in the enterprise network 105.

Figure 2:
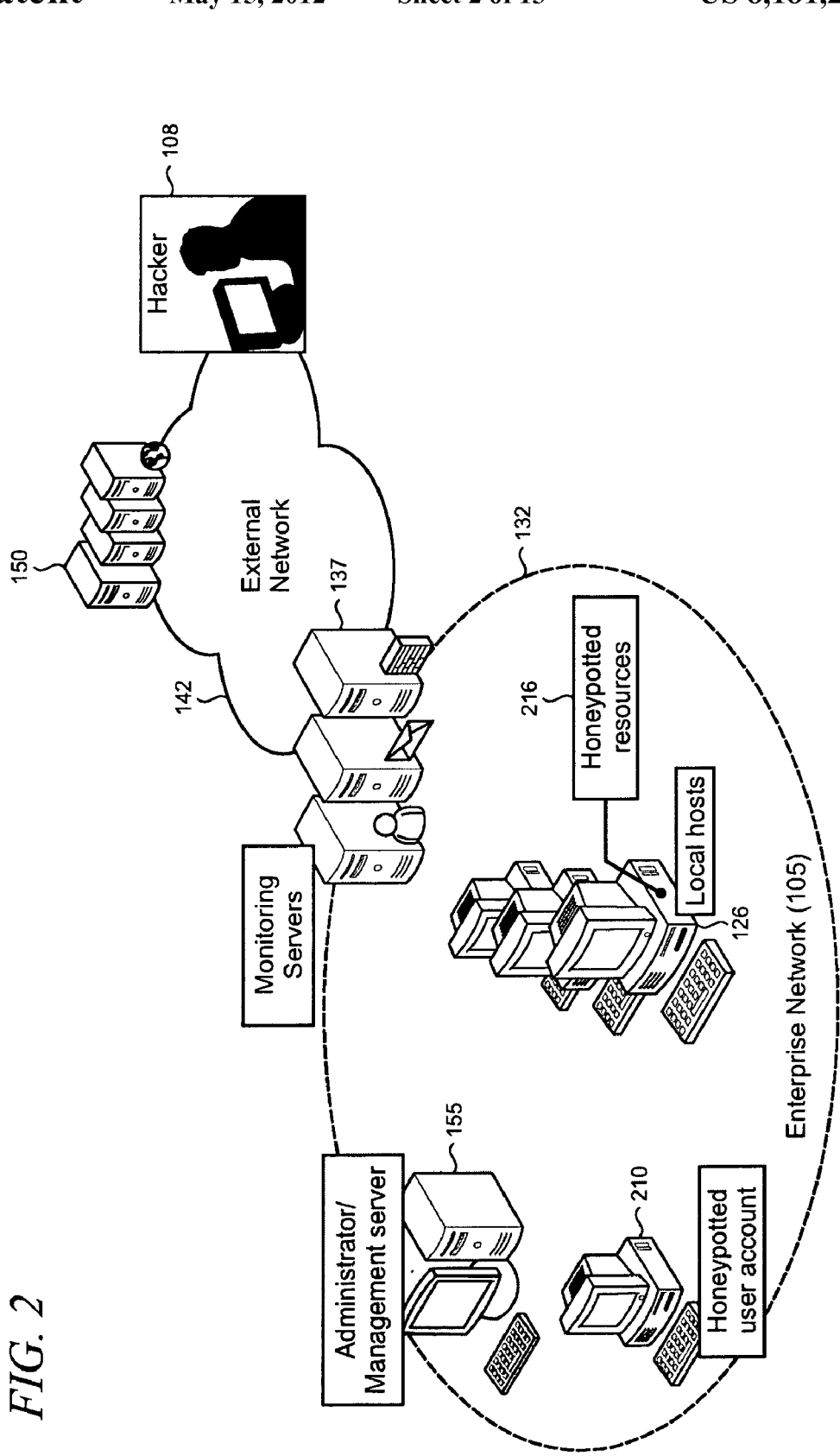
FIG. 2 shows an illustrative enterprise network in which a fake user account and resources are honeypotted.

As shown in FIG. 2, the present personalized honeypot arrangement may be implemented in the enterprise network 105 using several different techniques. These include setting up a fake honeypotted user account 210 as well as honeypotting specific computing resources in the enterprise network 105 as indicated by reference numeral 216 in FIG. 2. Both techniques enable a variety of different resources to be honeypotted.

Figure 3:
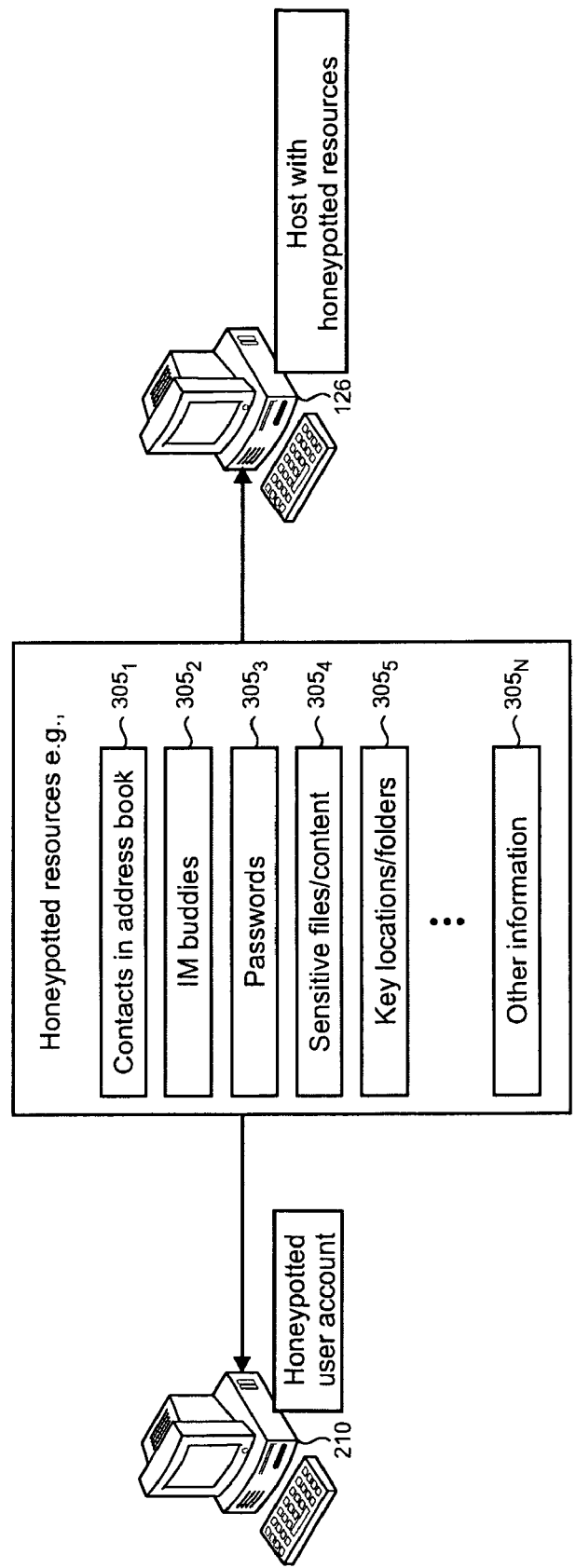
FIG. 3 shows a set of illustrative computing resources that may be honeypotted.

An illustrative set of computing resources $305_{1, 2 \ldots N}$ which may be honeypotted is shown in FIG. 3. It is emphasized that the particular resources that may be honeypotted in a given usage scenario may differ from what is shown in FIG. 3, and not all resources 305 will necessarily be used in each scenario. In this example, the resources which may be honeypotted include desktop resources that may be typically utilized on a host 126 (or by a host used for the honeypotted user account 210) such as contacts in an address book $305_1$, an IM contact or "buddy" list $305_2$, passwords $305_3$, sensitive or confidential files and/or content $305_4$, which may contain keywords such as "confidential," "proprietary," "sensitive," or "password," information or data that is stored in key locations or folders $305_5$ (e.g., "My Documents" folder), or other information $305_N$ that is deemed having such significance or importance to warrant honeypotting.

The honeypotted resources 305 may include both real resources for which protection against leakage is desired, as well as fake resources that are used solely as bait to lure and then detect attacks. Fake resources will generally be designed to appear to be legitimate and valuable, but the disclosure of which to the hacker 108 would not cause any real harm to a user or the enterprise network 105 as a whole. Typically, the honeypotted user account 210 will be populated with fake resources, while a host 126 may include both real and fake honeypotted resources.

In the host case, for example, a user of the host 126 may have a file of personal passwords that are sensitive and confidential, that if compromised could cause harm to the user. The user might honeypot the password file as an additional line of defense against information leakage or malicious attack so that the passwords could be immediately changed in the event that the user learns that the honeypotted resources have been accessed. In addition to honeypotting real resources such as the sensitive password file, fake resources may also be honeypotted on the host 126 as bait in order to increase the number of honeypots available for luring and detecting attacks against the enterprise network 105 by the hacker 108.

Figure 4:
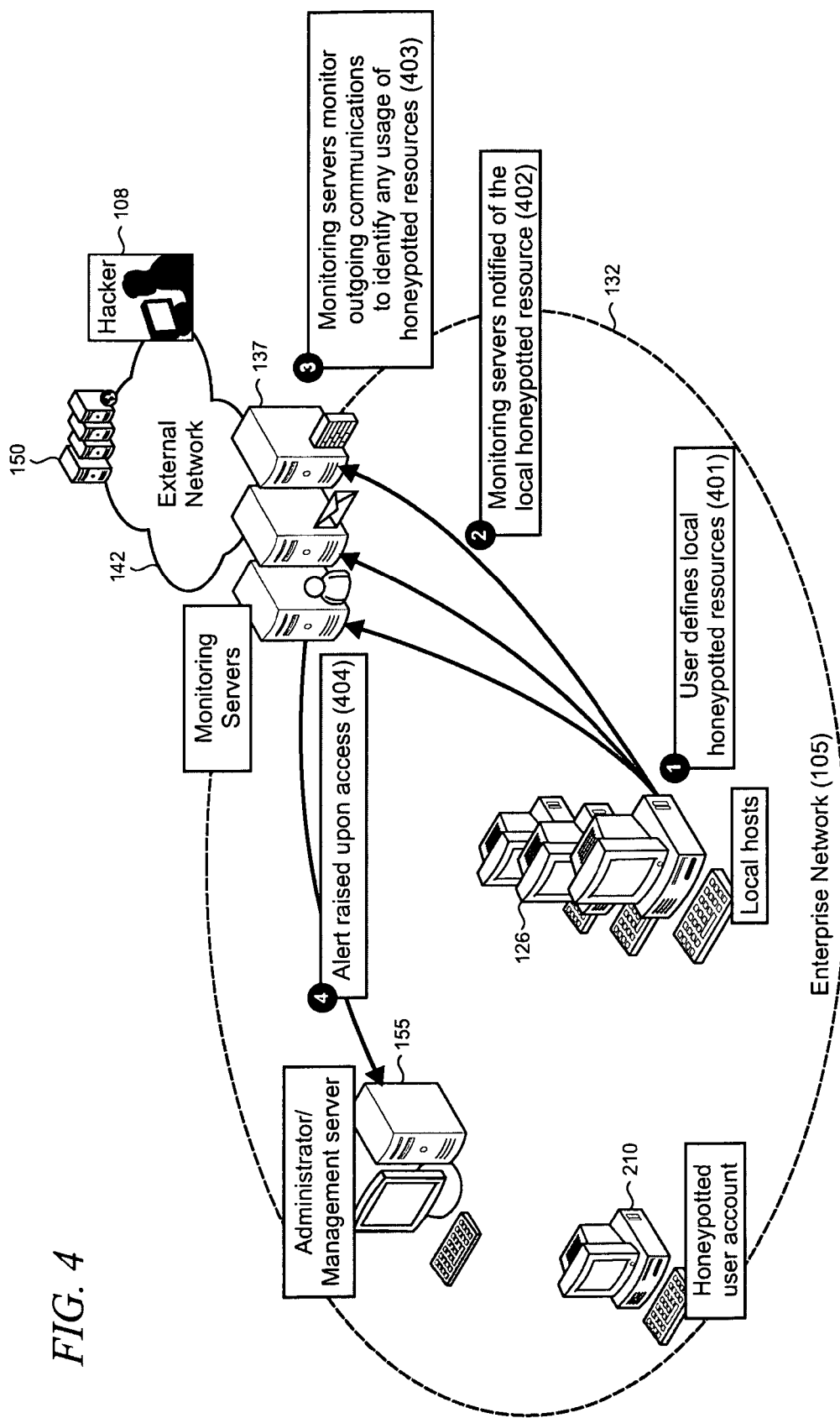
FIG. 4 shows an illustrative scenario in which a user defines a honeypotted resource at a local host which notifies monitoring servers at the enterprise network edge of the identity of the honeypotted resource.

As noted above, the enterprise network 105 supports both the honeypotting of resources on a host 126 as well as use of a honeypotted user account. The honeypotted resource will be described first. FIG. 4 shows an illustrative scenario in which a user defines one or more local honeypotted resources (401) which may include real or fake resources (e.g., resources 305 in FIG. 3). A notification is then provided from the host 126 (402) to identify the honeypotted resources to the monitoring servers 137 at the enterprise network perimeter 142. It is noted, however, that other locations may also be utilized for the monitoring servers. The resource may be identified, for example, by file name, signature, content, or by other identification methods that enable the identity of a resource to be uniquely resolved by the monitoring servers 137. Typically, a channel that is separate and secure from the data communication channel will be utilized to carry the notification to further protect the integrity of the honeypot. For example, for a resource pertaining to e-mail, the notification to the monitoring server will be carried using a non-e-mail communications facility to prevent the honeypot from being revealed to the hacker should the e-mail application on a host become compromised from a malicious attack. In addition, the notification may include a designation which indicates whether the honeypotted resource is a real resource or whether it is fake.

The monitoring servers 137 are arranged to monitor outgoing communications from the enterprise network 105 to the external network 142 so that any usage of the honeypotted resources may be detected (403). For example, if an e-mail address book is defined by a user at a host 126 as a honeypotted resource, the e-mail server is configured for scanning outbound e-mails where the address book or a contact in the address book might be included as an attachment or included as part of the e-mail's content. The other monitoring servers utilized in a given implementation—the firewall, IM server, event monitoring logging, auditing/journaling, etc.,—will apply monitoring in a manner that is specific to their functionality.

In most cases, the honeypot and the monitoring are kept separated on different devices so that attacks against a local host 126 which may compromise its integrity will not reveal that it is a honeypot. However, in alternative arrangements it may be possible to use a local monitoring agent that is resident on the host 126.

In the event that a monitoring server 137 detects any usage of the honeypotted resource through an attempt to move the honeypotted resource over the network perimeter 132, an alert is generated (404) that identifies the affected resource and the compromised host machine. The notification is received by the management server 155 which may apply appropriate remediation techniques such as shutting down the network port on the host 126, scanning the host for malware, and the like.

Figure 5:
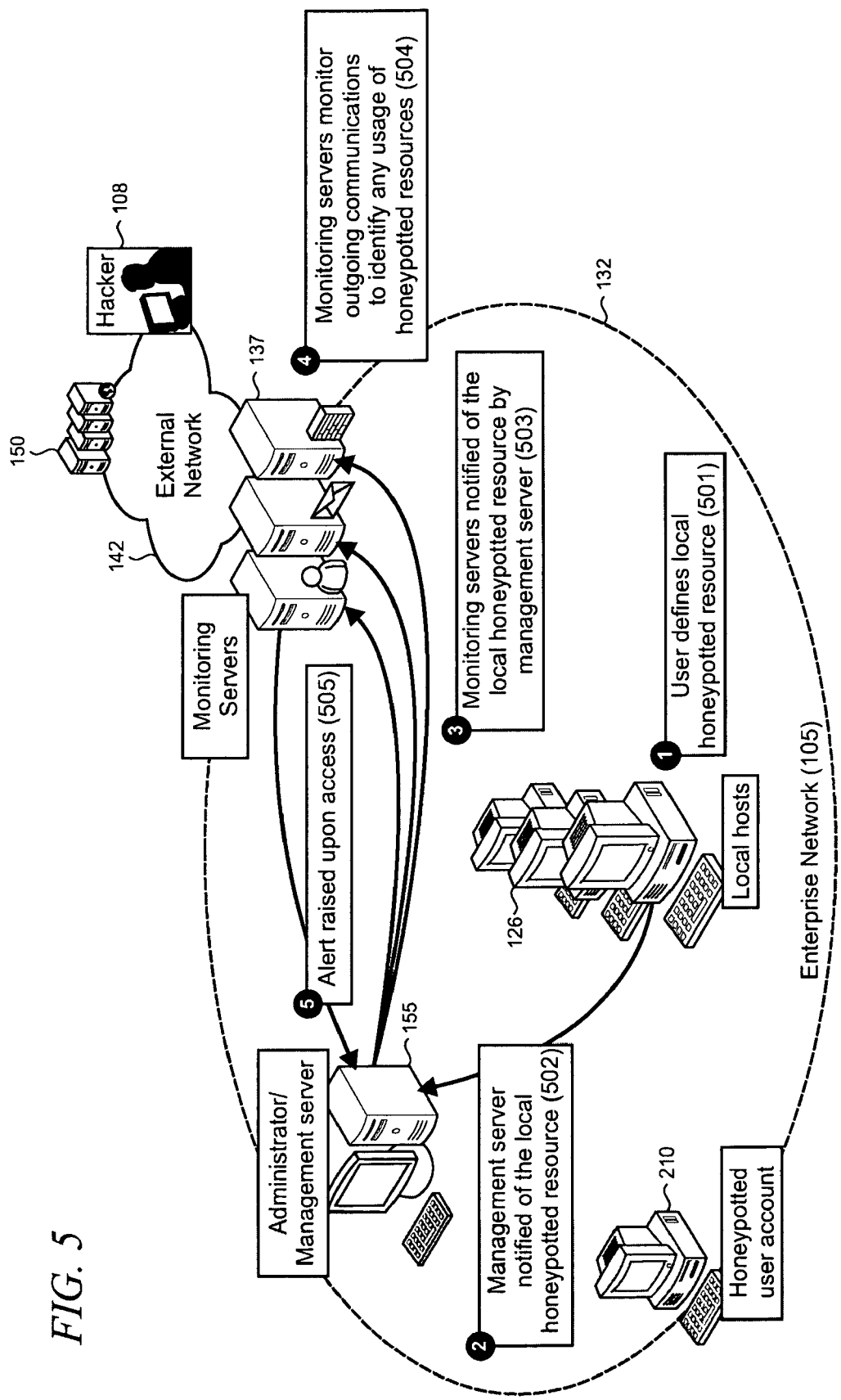
FIG. 5 shows an illustrative scenario in which a user defines a local honeypotted resource and notifies a central management server which populates the notification information to the monitoring servers on the network edge.

FIG. 5 shows a scenario that is similar to that shown in FIG. 4, but where the host 126 notifies the management server 155 of the identity of the honeypotted resource. More particularly, the user defines one or more honeypotted resources on the host 126 (501). A notification is provided to the management server 155 (502) which then populates information regarding the identity of the honeypotted resources to the monitoring servers 137 (503). The monitoring servers 137 scan outgoing communications from the enterprise network 105 to the external network 142 so that any usage of the honeypotted resources may be detected (504). When an attempt to move the honeypotted resource over the network perimeter 132 is detected, an alert is generated (505) and sent to the management server 155 to identify the affected resource and the compromised host machine.

Figure 6:
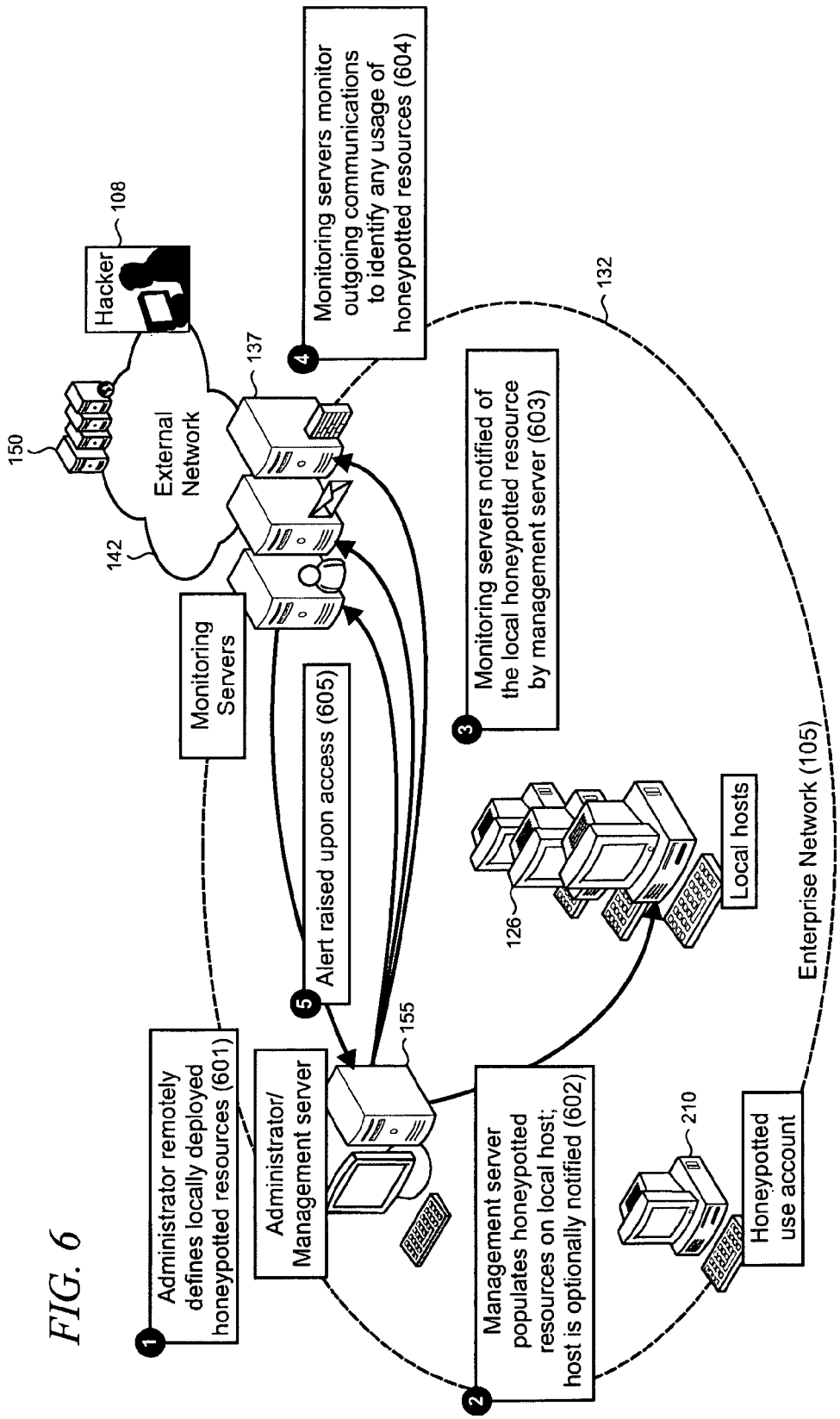
FIG. 6 shows an illustrative scenario in which an administrator defines a honeypotted resource which is populated on a machine of a local user in the enterprise network.

In addition to a user defining a resource that is honeypotted on a local host 126 to personalize a honeypot as shown in FIGS. 4 and 5 and described in the accompanying text, an administrator in the enterprise network 105 may define honeypotted resources at the management server 155 for deployment on the local host. This scenario is shown in FIG. 6.

The administrator working at the management server 155 or an administrator console defines the honeypotted resources for deployment on the local host 126 (601). In many implementations, such resources will be fake and used as bait for the honeypot on the host 126 in order to utilize the host for luring and detecting malicious attacks. The defined honeypotted resources may then be populated on one or more of the local hosts 126 (602). The administrator may wish to notify the user of a host 126 of the honeypotted resources 216 using a secure notification channel, but this does not need to be performed in all cases and thus is considered optional.

The management server 155 will populate information regarding the identity of the honeypotted resources to the monitoring servers 137 (603). The monitoring servers 137 scan outgoing communications from the enterprise network 105 to the external network 142 so that any usage of the honeypotted resources may be detected (604). When an attempt to move the honeypotted resource over the network perimeter 132 is detected, an alert is generated (605) and sent to the management server 155 to identify the affected resource and the compromised host machine.

Figure 7:
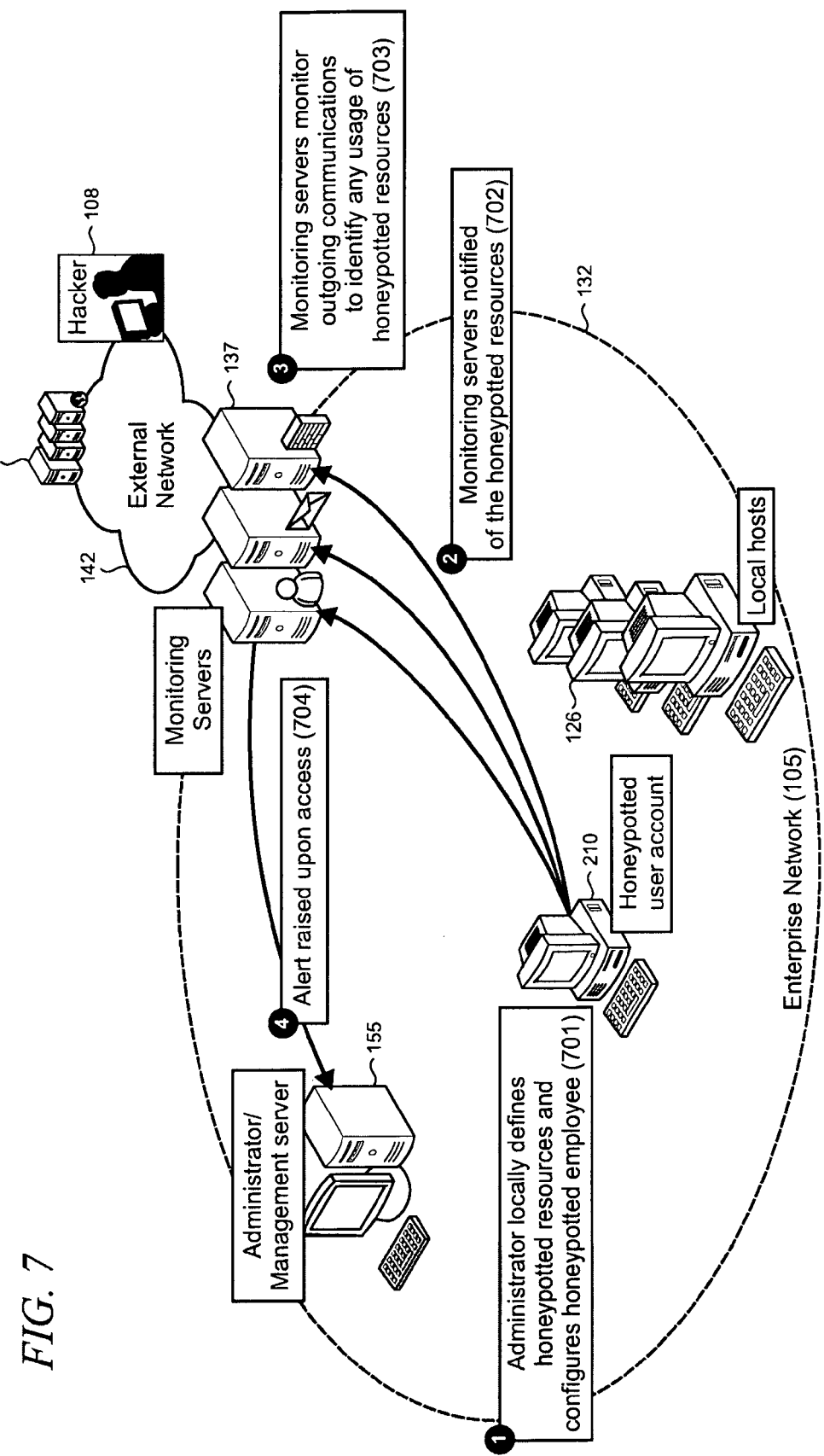
FIG. 7 shows an illustrative scenario in which an administrator locally defines a honeypotted resource and configures a machine of a fake honeypotted user account.

Turning now to the honeypotted user account 210, FIG. 7 shows an illustrative scenario where the network administrator works locally at a host machine that supports the honeypotted user account to define honeypotted resources and configure the host to mimic the actions of a real employee (701). The honeypotted user account 210 may alternatively be implemented using a server deployed in the enterprise network 105 that is configured to outwardly appear as a regular host. As noted above, the resources defined for the honeypotted user account 210 will typically be fake and used as bait for the honeypot.

A notification is provided from the honeypotted user account 210 (702) to identify the honeypotted resources to the monitoring servers 137 at the enterprise network perimeter 132. The monitoring servers 137 monitor outgoing communications to identify any usage of honeypotted resources (703). In the event that a monitoring server 137 detects any usage of the honeypotted resource through an attempt to move the honeypotted resource over the network perimeter 132, an alert is generated (704) that identifies the affected resource and the compromised host machine.

Figure 8:
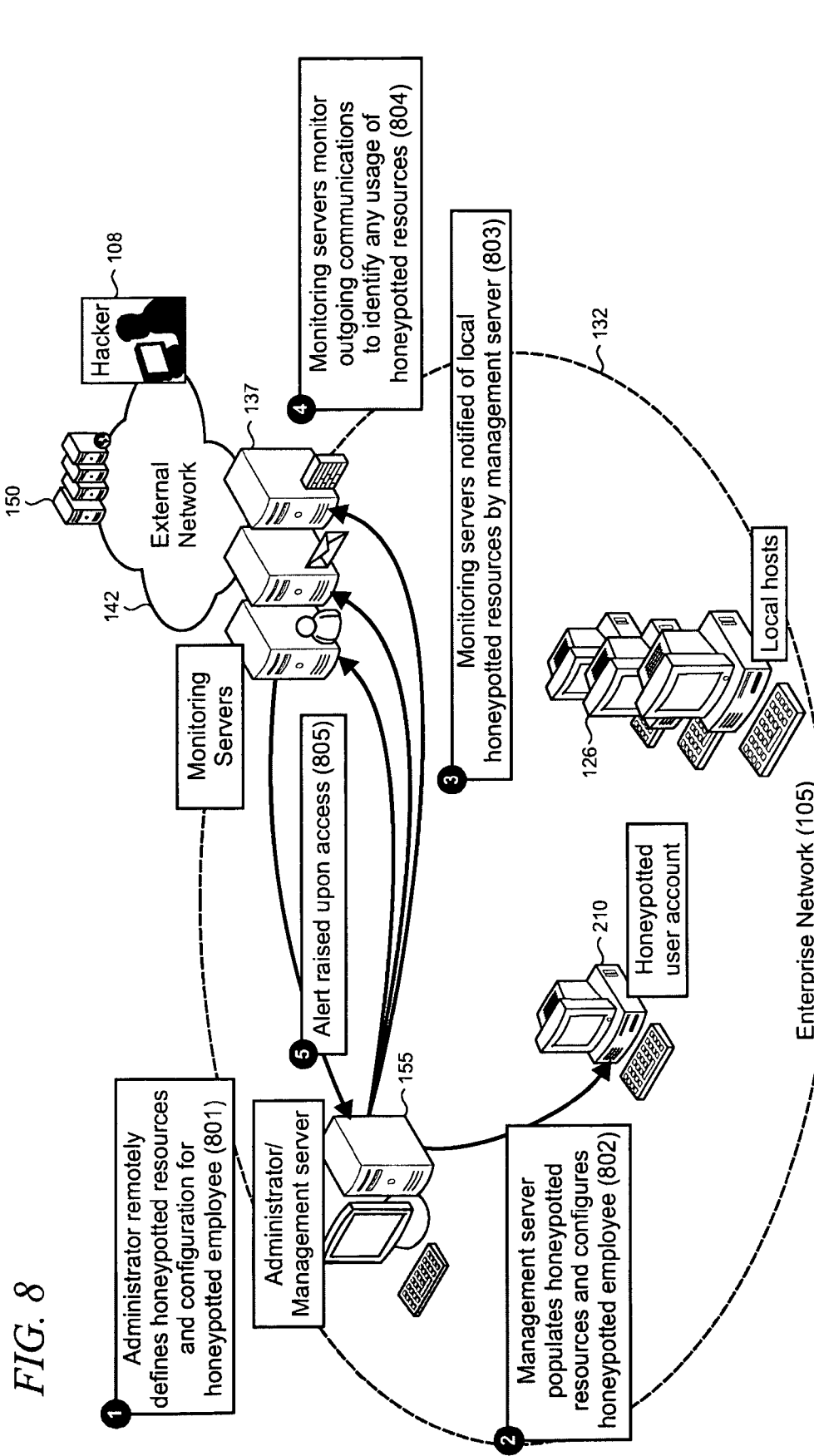
FIG. 8 shows an illustrative scenario in which an administrator remotely defines the honeypotted resource and configures the machine of the fake honeypotted user account.

FIG. 8 shows another illustrative scenario in which the network administrator may define the honeypotted resources and configure the host to mimic a real employee. Here, the administrator works from the management server 155 to remotely define the honeypotted resources and configuration for the honeypotted user account 210 (801). The honeypotted resources and configuration information are then populated onto the honeypotted user account (802). Notification information is also populated from the management server 155 to the monitoring servers 137 (803). As with the other illustrative scenarios described above, the monitoring servers 137 scan outgoing communications from the enterprise network 105 to the external network 142 so that any usage of the honeypotted resources may be detected (804). When an attempt to move the honeypotted resource over the network perimeter 132 is detected, an alert is generated (805) and sent to the management server 155 to identify the affected resource and the compromised host machine.

Figure 9:
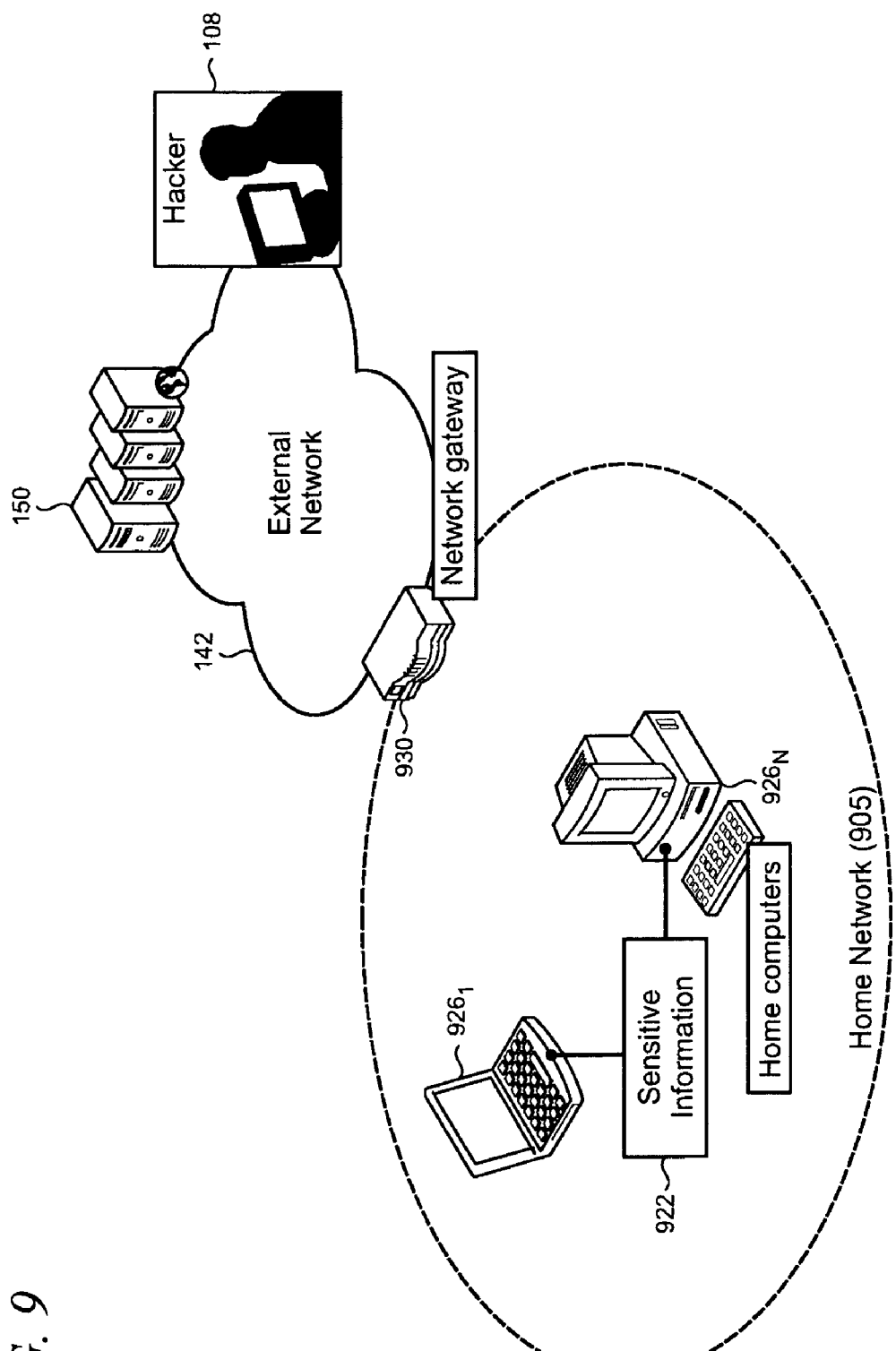
FIG. 9 shows an illustrative home networking environment that is subject to attacks from a hacker.

The present personalized honeypot arrangement may also be utilized in a home network environment. FIG. 9 shows an illustrative home network 905 that is subject to Internet-based attacks from the hacker 108 in a similar manner as the enterprise network 105 shown in FIGS. 1-8. The home network may include one or more home computers 926$_{1-N}$ that are typically coupled to the external network 142 to communicate with resources 150 using a network gateway device 930 to access a service provided by an Internet service provider ("ISP"). The home computers 926 will typically hold sensitive or valuable information and resources (collectively identified by reference numeral 922). As many home networks use personal security tools such as anti-virus and anti-malware products, in most scenarios the home user or consumer will honeypot real resources as a way to provide a supplemental line of defense against malicious attacks.

Figure 10:
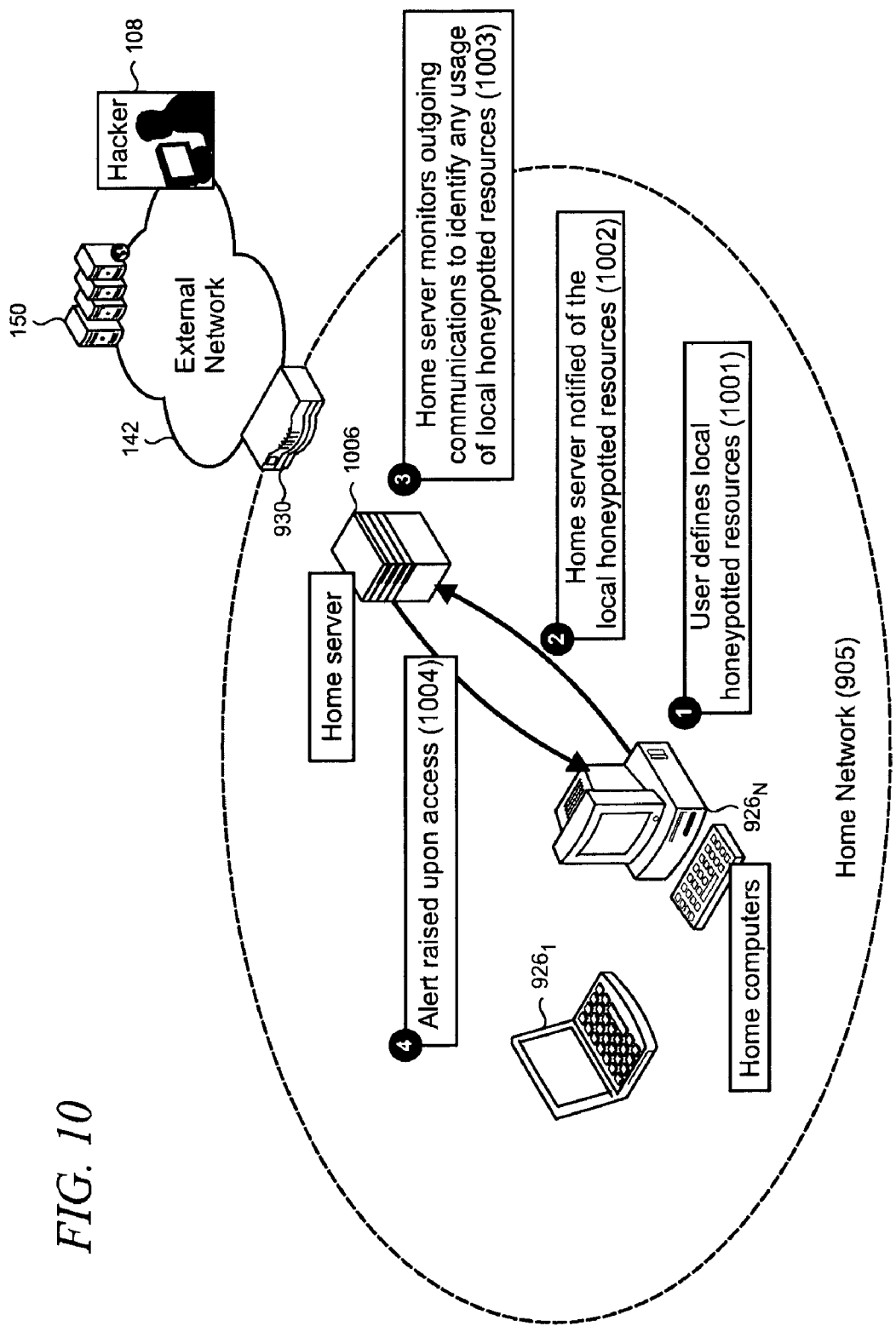
FIG. 10 shows an illustrative scenario in which a user defines a local honeypotted resource and notifies a home server in the home network of the resource.

Honeypotting resources in a home network environment can be implemented using several alternative techniques. As shown in FIG. 10, a home server 1006 may be utilized to perform the honeypot monitoring functionality which provides the same benefits of separating the honeypot implementation from honeypot monitoring to avoid revealing the honeypot to the hacker 108 should a honeypotted resource be accessed. As with the enterprise network example provided above, while such separation is typically beneficial, it may also be possible to utilize a monitoring agent that is locally instantiated on the home computer 926.

The home user defines resources that are desired for honeypotting (1001). As with the illustrative enterprise network examples discussed above, resources that may honeypotted using the present arrangement are virtually unlimited and may include resources from the illustrative set shown in FIG. 3. The home user may define honeypotted resources to enable the honeypot's line of defense against malicious attacks to be personalized to the user's particular needs or concerns. Alternatively, an application or utility may be deployed on the home computer 926, the home server 1006, or as a service provided over the Internet (i.e., a "cloud service") that may assist the home user in identifying and defining appropriate local resources to be honeypotted.

A notification is then provided from the home computer 926 (1002) to identify the honeypotted resources to the home server 1006. The home server 1006 is arranged to monitor outgoing communications from the home network 905 to the external network 142 so that any usage of the honeypotted resources may be detected (1003). This may be accomplished, for example, by scanning outbound e-mails, instant messages, outbound web communications and the like to look for file names, signatures, or content that is associated with the honeypotted resources.

In the event that the home server 1006 detects any usage of the honeypotted resources through an attempt to move a resource outside the home network 905, an alert is generated (1004) that identifies the affected resource and the compromised home computer 926. The notification is received by the home computer 926 which may trigger appropriate remediation techniques such as shutting down the network port on the computer, or launching an anti-virus/anti-malware program, for example. In the home network environment, such remediation techniques may be automatically triggered in the event of an alert to enable the attack to be mitigated without affirmative intervention by the home user.

Figure 11:
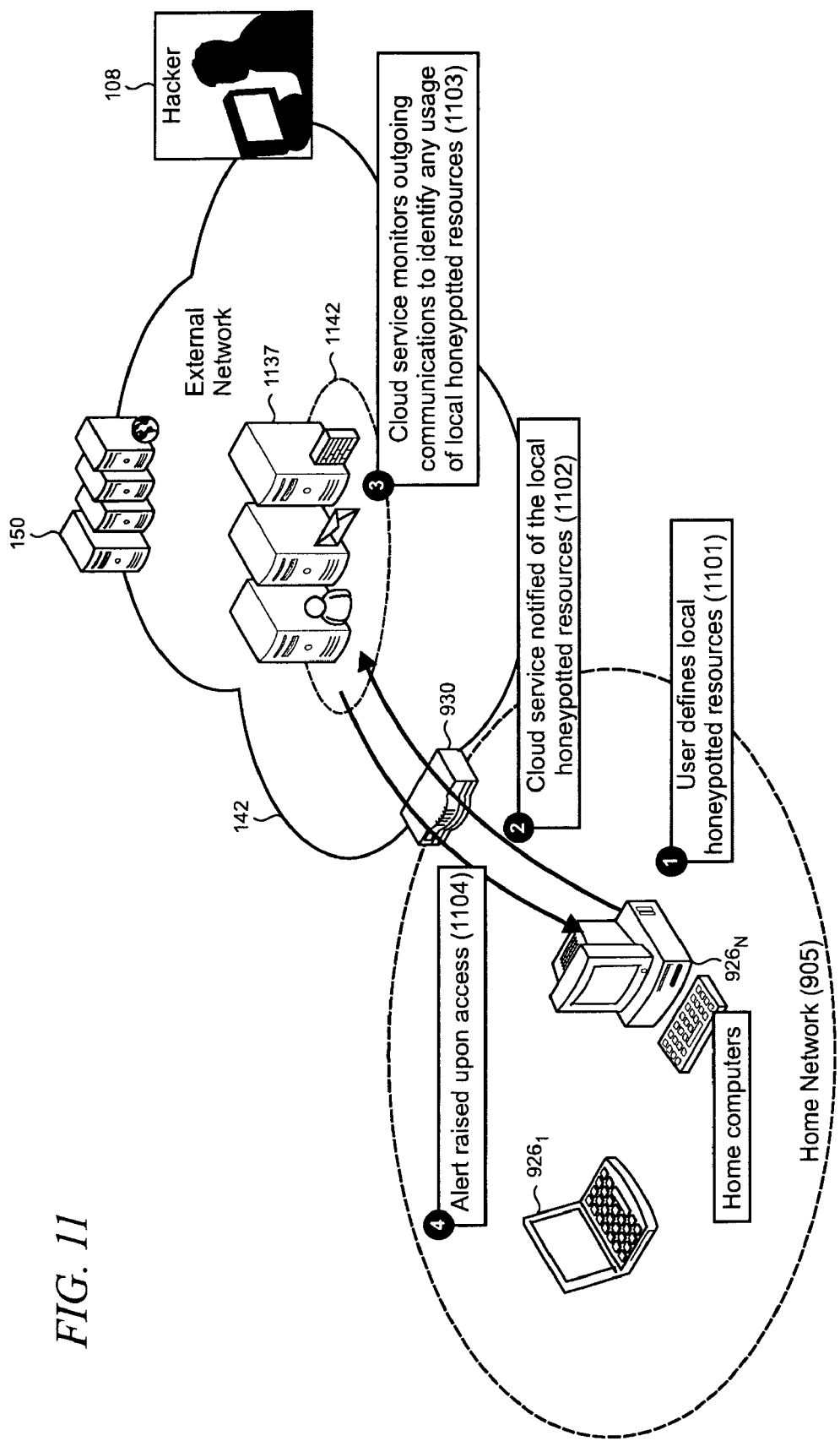
FIG. 11 shows an illustrative scenario in which a user defines a local honeypotted resource and notifies a monitoring server which is provisioned as a cloud-based service.

Another technique for implementing a personalized honeypot in a home network environment is shown in the illustrative scenario in FIG. 11. In this example, a group of monitoring servers 1137 are implemented as cloud-computing resources which provide honeypot monitoring as a cloud service 1142. The monitoring servers 1137 may be configured to provide functionalities that are similar in feature set and capabilities as the monitoring servers 137 shown in FIG. 1 and described in the accompanying text. However, it is emphasized that the particular monitoring functionality utilized may vary between implementations of the present honeypot arrangement.

As with the previous scenario, the home user defines resources that are desired for honeypotting (1101). A notification is then provided from the home computer 926 (1102) to identify the honeypotted resources to the monitoring servers 1137 in the cloud service 1142. The monitoring servers 1137 monitor outgoing communications from the home network 905 to the external network 142 through the service 1142 so that any usage of the honeypotted resources may be detected (1103). If the monitoring servers in the cloud service 1142 detects any usage of the honeypotted resources through an attempt to move a resource outside the home network 905, an alert is generated (1104) and sent to the home computer 926 that identifies the affected resource and the compromised home computer 926. The home computer 926 can then implement remediation techniques as described above.

Figure 12:
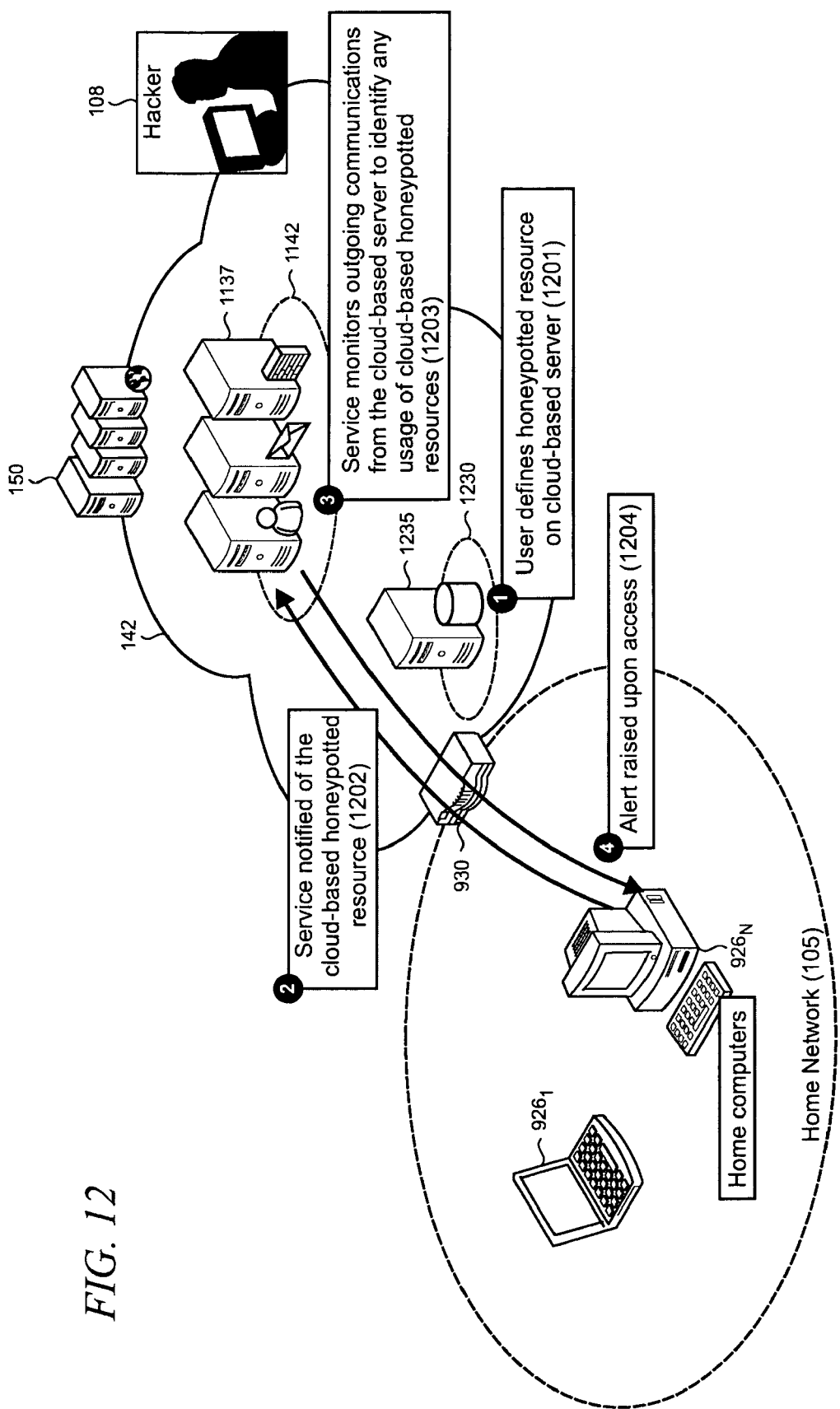
FIG. 12 shows an illustrative scenario in which a user defines a honeypotted resource on a cloud-based asset and notifies a monitoring server which is provisioned as a cloud-based service.

The extensibility of the present honeypot arrangement to virtually any resource is highlighted in the scenario shown in FIG. 12 in which a home user may define a cloud-based resource for honeypotting. For example, the home user might use an online service 1230 that is implemented in the cloud to store photographs and videos which are uploaded to a server 1235 that is associated with the online service 1230. In such cases, the home user may wish to set up an additional line of defense against unauthorized access of the resources.

In this scenario, the home user defines a resource like a photo album on the server 1235 that is honeypotted (1201). The monitoring service 1142 is notified from the home computer 926 of the identity of the honeypotted online resource (1202) on the server 1235. The monitoring servers 1137 then monitor outgoing communications from the server 1235 to identify any attempted usage of the honeypotted resource (1203). If so, then an alert is generated and sent to the home user (1204) who may mitigate the attack, for example, by contacting the online service 1230. In some cases, such mitigation response can be automated at the home computer 926 to enable steps to be taken without requiring affirmative activity from the home user. Alternatively, the monitoring service 1142 may notify the online service 1230 directly of the unauthorized access of the honeypotted resource.

Figure 13:
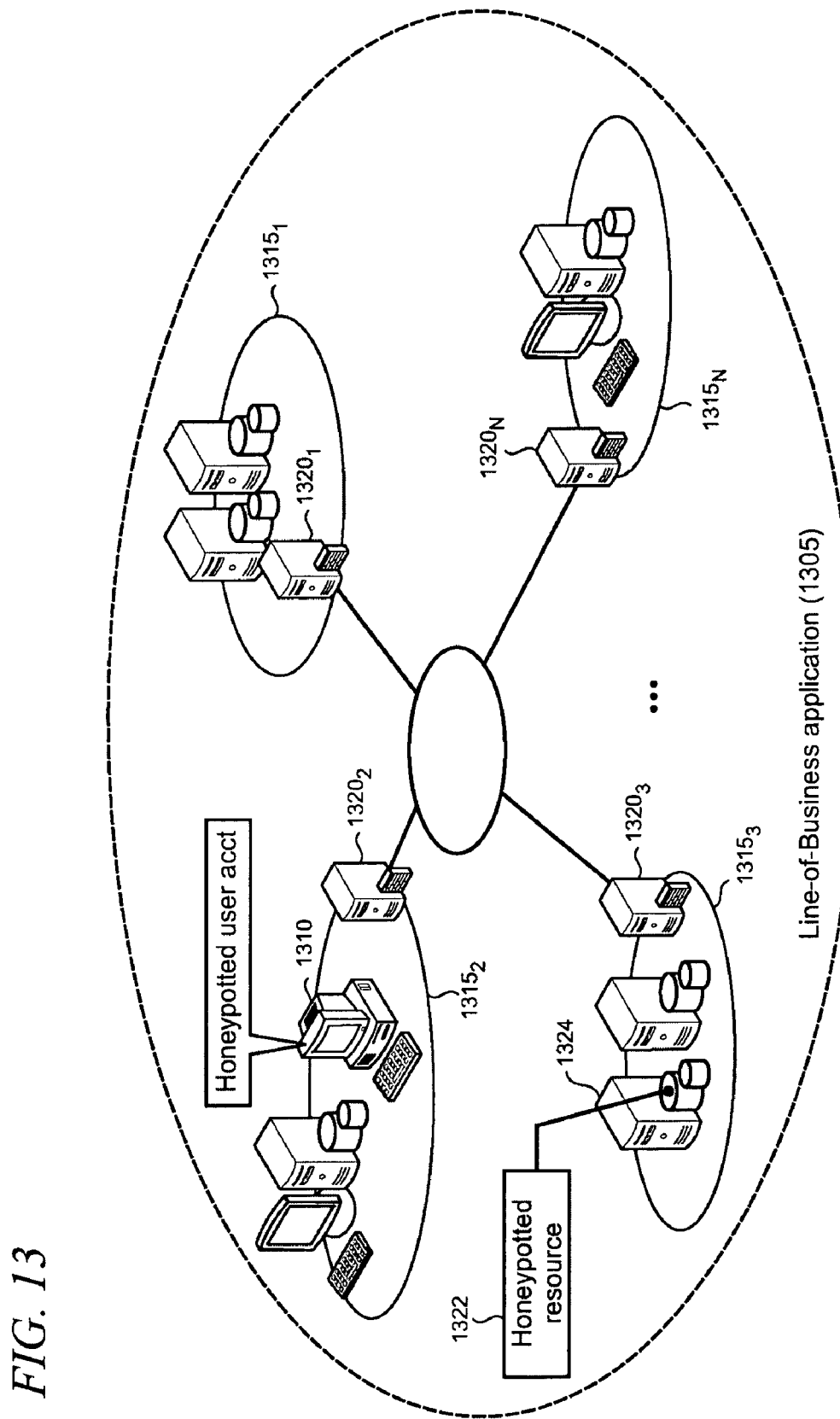
FIG. 13 shows an illustrative line-of-business application that is arranged to support a fake honeypotted user account and honeypotted resources.

The present honeypot arrangement is further extensible to other types of computing environments where the concept of honeypotting virtually any resource may provide further benefits. FIG. 13 shows an illustrative scenario in which a line-of-business ("LOB") application 1305 is utilized to support an enterprise which might be distributed over a large geographic area with multiple offices or facilities. A LOB application often comprises multiple integrated capabilities such as accounting, supply chain management, and resource planning that may be logically, functionally, or physically distributed into modules or nodes as represented in FIG. 13 by reference numeral $1315_{1, 2 \ldots N}$. Such capabilities are commonly tied into various databases and database management systems. As shown, the nodes 1315 utilize computing infrastructure such as hosts, servers, administrator consoles and the like. In this example, monitoring servers $1320_{1, 2 \ldots N}$ are interspersed among the respective nodes to monitor communications flowing between the nodes. As with the previous enterprise and home network scenarios, the monitoring functionality and honeypot implementation are typically separated to avoid revealing the honeypot to the hacker if a host machine becomes compromised. However, in some implementations a monitoring agent may be utilized on the host or server that implements the honeypot.

In accordance with the present honeypot arrangement, a honeypotted user account 1310 may be disposed in a node 1315 and baited with fake resources that are selected to be of interest to a hacker in order to enhance the capability of detecting attacks against the LOB application 1305. In this case, the honeypotted user account 1310 may be baited with honeypotted resources, configured and operated to mimic a real employee in a similar manner as with the honeypotted user account 210 shown in FIGS. 7 and 8 and described in the accompanying text. The monitoring server $1320_2$ that monitors the node $1315_2$ is notified of the honeypotted user account 1310 and the honeypotted resources it contains. Attempts to access resources on the honeypotted user account 1310 as monitored by the monitoring server $1320_2$ will be assumed to be malicious and appropriate remediation techniques may be implemented.

Resources supporting the LOB application 1305 may also be honeypotted using either fake resources to bait honeypots deployed in the system to enhance attack detection, or using real resources where the honeypot provides an additional line of defense for sensitive assets. As shown, resources identified by reference numeral 1322 are honeypotted in a representative database server 1324 in the node $1315_3$. Resources 1322 may include virtually any type of resource that is meaningful to the enterprise or has value as bait and may be selected, for example, from the illustrative set shown in FIG. 3.

As with the enterprise network scenarios discussed above, notification of the identity of the honeypotted resources 1322 in the LOB application 1310 is provided to the monitoring server $1320_3$. The monitoring server $1320_3$ scans outbound communications from the node $1315_3$ to determine when the honeypotted resource is accessed and raises alerts to trigger appropriate remediation.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computer-readable medium, not comprising a propagated data signal, containing instructions which, when executed by one or more processors disposed in an electronic device, perform a method for associating a resource in a computing environment with a honeypot, the method comprising the steps of:
   providing a bait-defining facility to a user on a local host for the user to define one or more resources for honeypotting;
   associating unique identifiers at the local host with respective ones of the honeypotted resources defined by the user with the bait-defining facility;
   providing the unique identifiers in notifications from the local host for transmission to a remote honeypot monitoring functionality disposed in a monitoring server that is instantiated in a separate computing platform from the local host so that any compromise of the local host does not reveal the existence of the user-defined honeypotted resources to an attacker, the notifications identifying the user-defined honeypotted resources to the monitoring functionality, the monitoring functionality being arranged for monitoring usage of the user-defined honeypotted resources responsively to the notifications and for generating an alert to a management server when unauthorized use of the user-defined honeypotted resources is detected, the alert identifying the affected user-defined honeypotted resource and identifying a compromised local host, the management server being arranged for implementing remediation on the compromised local host following receipt of the alert;
   maintaining a data communication channel in the computing environment over which data traffic flows between the local host and the monitoring server; and
   maintaining a bi-directional secure communications channel over which the notifications identifying the user-defined honeypotted resources are transmitted to the monitoring server and over which the alert is transmitted from the monitoring server, the bi-directional secure communications channel being configured to be separate from the data communications channel so that interception of data traffic by the attacker does not reveal the existence of the user-defined honeypotted resources to the attacker.

2. The computer-readable medium of claim 1 in which the resources are honeypotted on the local host.

3. The computer-readable medium of claim 1 in which the resources are honeypotted on a remote online server.

4. The computer-readable medium of claim 1 in which the resources are honeypotted in a line-of-business application.

5. The computer-readable medium of claim 1 in which the monitoring functionality is provided on a platform that is distinct from the local host.

6. The computer-readable medium of claim 1 in which the monitoring functionality is provided by a monitoring agent that is instantiated on the local host or instantiated outside of the local host.

7. The computer-readable medium of claim 1 in which the unique identifiers are selected from one of filename, signature, or content.

8. The computer-readable medium of claim 1 in which the resources selected by the user through the bait-defining facility as honeypotted bait comprise one of personal information, e-mail contacts, instant messaging contacts, default passwords, confidential information, sensitive information, data in key locations, data in key folders, IP address, URL, user account name, computer group, or user group.

9. The computer-readable medium of claim 1 in which the notifications notify the monitoring functionality that resources are fake resources that are configured to appear legitimate and which are used as honeypotted bait.

10. A method for remotely configuring a honeypot on a local host that is coupled to a plurality of monitoring servers on a network, the method comprising the steps of:

defining resources for honeypotting on the local host;

placing the resources in a honeypot on the local host;

providing notifications to a honeypot monitoring functionality instantiated on each of the monitoring servers, each of the monitoring servers being instantiated in a separate computing platform from the local host so that a compromise of the local host does not reveal the existence of the user-defined honeypotted resources to an attacker, and each of the monitoring servers providing a business application-specific functionality, the monitoring functionality being arranged for monitoring usage of the honeypotted resources responsively to the notifications, the notifications uniquely identifying the honeypotted resources on the local host and each of the monitoring servers being further arranged for generating an alert to a management server when unauthorized use of the user-defined honeypotted resources is detected, the alert identifying the affected user-defined honeypotted resource and identifying a compromised local host, the management server being arranged for implementing remediation on the compromised local host following receipt of the alert;

maintaining a data communication channel over which data traffic flows between the local host and each of the monitoring servers; and maintaining a bi-directional secure communications channel over which the notifications identifying the user-defined honeypotted resources are transmitted to the monitoring servers and over which the alert is transmitted from a monitoring server, the bi-directional secure communications channel being configured to be separate from the data communications channel so that interception of data traffic by the attacker does not reveal the existence of the user-defined honeypotted resources to the attacker.

11. The method of claim 10 in which the network comprises one of enterprise network or home network and the business application-specific functionality comprises one of e-mail, instant-messenger, firewall, event monitor, event logger, or auditing/journaling.

12. The method of claim 10 including a further step of defining the resources as fake resources for luring malicious attacks.

13. The method of claim 10 including a further step of defining the resources as real resources for which the honeypot provides an additional line of defense against malicious attacks.

14. The method of claim 10 including a further step of configuring the local host to mimic the actions of a real user.

15. A method for providing a monitoring service of a honeypot on a host, the method comprising the steps of:

adapting one or more monitoring servers that provide one or more business application-specific functionalities to include a monitoring functionality for monitoring outbound communications between the host and an external network, each of the monitoring servers being instantiated in a separate computing platform from the local host so that a compromise of the local host does not reveal the existence of the user-defined honeypotted resources to an attacker, and each of the monitoring servers being further arranged for generating an alert to a management server when unauthorized use of the user-defined honeypotted resources is detected, the alert identifying the affected user-defined honeypotted resource and identifying a compromised local host, the management server being arranged for implementing remediation on the compromised local host following receipt of the alert and each of the monitoring servers being selected from one of e-mail server, instant messaging server, firewall, event monitoring server, event logging server, auditing server, or journaling server;

maintaining a data communication channel over which data traffic flows between the local host and the monitoring servers;

maintaining a bi-directional secure communications channel over which the notifications identifying the user-defined honeypotted resources are transmitted to the monitoring server and over which the alert is transmitted from the monitoring server, the bi-directional secure communications channel being configured to be separate from the data communications channel so that interception of data traffic by the attacker does not reveal the existence of the user-defined honeypotted resources to the attacker;

receiving a notification at the monitoring servers that identifies a resource that is honeypotted on the host;

scanning the outbound communications from the host at the monitoring servers to detect usage of the honeypotted resource identified from the notification; and generating the alert when an outbound communication matches the identified honeypotted resource.

16. The method of claim 15 including a further step of implementing the monitoring servers in one of cloud-computing platform, edge devices in an enterprise network, host-based monitoring agent, or home server in a home network.

17. The method of claim 15 including a further step of identifying to the host the honeypotted resource that is matched to the outbound communication.

* * * * *